United States Patent [19]

Ortega

[11] Patent Number: 5,285,806

[45] Date of Patent: Feb. 15, 1994

[54] METHOD AND APPARATUS FOR TEMPORARILY SEALING OFF PIPELINES

[75] Inventor: Daniel A. Ortega, Englewood, Colo.

[73] Assignee: Public Service Company of Colorado, Denver, Colo.

[21] Appl. No.: 998,469

[22] Filed: Dec. 30, 1992

[51] Int. Cl.⁵ .................... F16K 7/10; F16L 55/124
[52] U.S. Cl. .................... 137/15; 15/104.16;
    15/104.2; 137/245; 137/245.5; 137/318; 138/97
[58] Field of Search .............. 137/15, 315, 317, 318,
    137/244, 245, 245.5; 138/93, 97; 15/104,
    104.16, 104.2

[56] References Cited

U.S. PATENT DOCUMENTS

| | | | |
|---|---|---|---|
| 1,860,855 | 5/1932 | Gardner | 138/93 |
| 1,946,138 | 2/1934 | Gardner | 138/93 |
| 3,564,103 | 2/1971 | Brachschob et al. | 138/93 |
| 3,842,864 | 10/1974 | Riegel et al. | 138/93 |
| 3,995,655 | 12/1976 | Sands | 137/318 |
| 4,127,141 | 11/1978 | Ledonne et al. | 137/318 |
| 4,155,373 | 5/1979 | DiGiovanni | 137/318 |
| 4,351,349 | 9/1982 | Minotti | 137/318 |
| 4,428,204 | 1/1984 | Brister | 138/93 |
| 4,458,721 | 7/1984 | Yie et al. | 137/318 |

FOREIGN PATENT DOCUMENTS

| | | | |
|---|---|---|---|
| 504392 | 4/1929 | Fed. Rep. of Germany | 138/93 |
| 2140894 | 12/1984 | United Kingdom | 138/93 |

Primary Examiner—George L. Walton
Attorney, Agent, or Firm—John E. Reilly

[57] ABSTRACT

A method and apparatus for sealing off flow in a pipeline for the purpose of repairing the line includes a combination of a restraining rod and inflation bag which can be installed on either or both sides of the intended site of repair; and a flexible sleeve is provided for use in association with the entry ports and any associated valve members for insertion of the restraining rod and bag to prevent the escape of gas from the line during the insertion procedures. Once the line is repaired, the restraining rod and inflation bag can be removed and the entry ports completely sealed off.

14 Claims, 1 Drawing Sheet

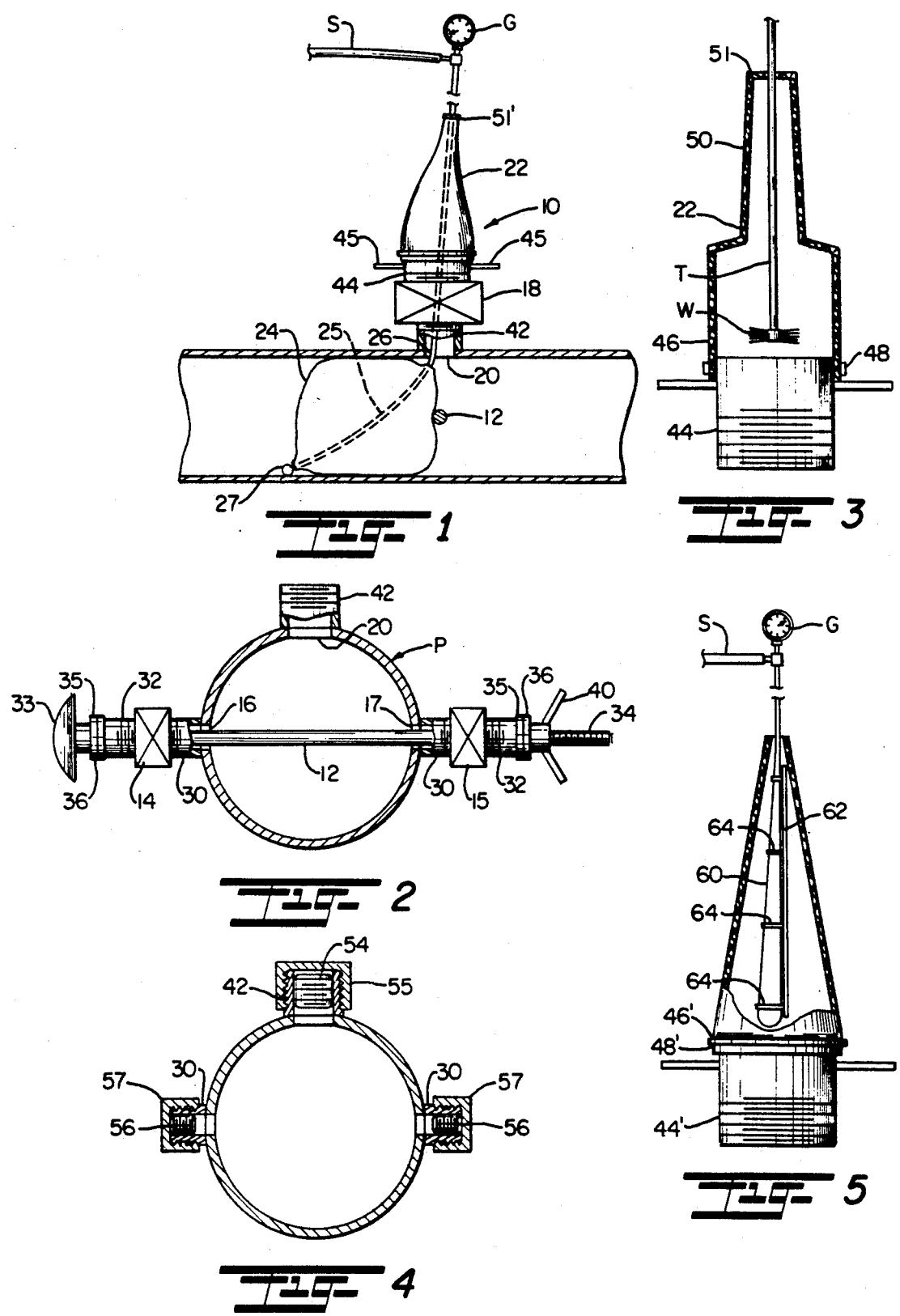

METHOD AND APPARATUS FOR TEMPORARILY SEALING OFF PIPELINES

This invention relates to methods and apparatus for repairing pipelines; and more particularly relates to a novel and improved method and apparatus for sealing off sections of a pipeline, such as, a gas main for the purpose of repair, servicing or modification of the main.

BACKGROUND AND FIELD OF INVENTION

The repair of gas mains can present substantial hazards to workmen and others in the vicinity who are exposed to large volumes of gas if the main is not effectively sealed off against leakage. Various types of inflationary bags have been devised to stop-off cast iron and large diameter steel pipe and, while these have been designed to discourage any tendency to be blown downstream due to slippage or leakage, have not been completely failsafe in use. Moreover, a serious problem in connection with the installation of inflationary bags is the loss of gas through the sidewall of the pipeline when the bag or other restraining device is being installed. For example, ALH Systems, Inc. of Wiltshire, England manufactures and sells stop-off equipment including Gas Bags in which the bag is assembled around a flexible central inflation rod to discourage the bag from slipping along the interior of the pipeline under gas pressure once the bag has been inflated into the desired position. Such bags are satisfactory from the standpoint of sealing off the interior of the pipeline but do not avoid the risk of slipping or being blown downstream through the pipeline under gas pressure and thus not effectively seal the interior of the line.

U.S. Pat. No. 4,627,470 to Carruthers is directed more to the use of primary and secondary bags which are independently inserted into a pipeline to be repaired with the primary bag being inserted into position against a support disk and the secondary bag mounted directly against a column which is inserted through a hole in the pipe but does not address the problem of sealing off the wall of the pipe during the insertion of the bags, support disks and column and to adequately cap off the insertion holes once the job is completed. U.S. Pat. No. 4,428,204 to Brister discloses the use of a bag which is inserted through an insertion apparatus, and the bag is filled with water and frozen in place. U.S. Pat. No. 4,827,984 to Young et al utilizes an inflatable plug inserted into a pipeline but which is primarily designed for use in oil platform applications. U.S. Pat. No. 4,458,721 to Yie et al discloses an inflatable sleeve for restricting fluid flow in a pipeline using different forms of cartridges.

Notwithstanding the various approaches that have been taken in the past, there is a continuing need and demand for a novel and effective method and means for sealing off sections of a gas main and in which the gas main is sealed off from leakage or escape of gas throughout the entire operation beginning with the insertion of sealing devices into the line and concluding with removal of the sealing devices and particularly the inflation bags once the job is completed.

SUMMARY OF INVENTION

It is therefore an object of the present invention to provide for a novel and improved method and apparatus for sealing off conduits, such as, gas mains when the main is being serviced or repaired.

Another object of the present invention is to provide a novel and effective means for insertion of sealing devices into a gas main which will prevent escape or leakage of gas during the insertion phase of the operation; and further wherein the sealing devices may be effectively removed and the main permanently sealed off once it has been repaired or serviced.

It is a still further object of the present invention to provide in apparatus for sealing off gas mains and the like for a novel and improved restraining member to prevent slippage or movement of the sealing device within the line.

It is an additional object of the present invention to provide for a novel and improved apparatus for sealing off conduits, such as, gas mains and other pipelines which is of low-cost simplified construction, can be rapidly assembled and installed in a minimum number of steps and is reusable.

It is a yet another object of the present invention to provide for a novel and improved method for successive and independent insertion of a restraining element and inflatable sealing device into a gas main for the purpose of temporarily sealing off the main during its repair or service.

In accordance with the present invention, in the repair of a pipeline, such as, a gas main to be repaired or serviced there has ben devised first and second valve means disposed at diametrically opposed wall portions of the pipeline and in communication with the interior of the pipeline, a restraining rod inserted through the first and second valve means for extension across the interior of the pipeline, third valve means disposed in a wall of the pipeline at an angle to the first and second valve means and in communication with the interior of the pipeline, an inflatable bag member inserted through the third valve means into the interior of the pipeline, and inflation means for inflating the bag to fill the interior of the pipeline. Preferably, the third valve means is centered in the wall of the pipeline between the first and second valve means with the restraining rod extending at right angles to the direction of insertion of the inflatable bag member, and a flexible sealing means including a sleeve member is disposed on one side of the third valve means opposite to the wall of the pipeline whereby to temporarily seal off the third valve means against escape of any gas from the pipeline when the bag member is inserted through the third valve means.

In the method for repairing pipelines in accordance with the present invention, first and second holes are tapped into diametrically opposed sidewall portions of the pipeline, first and second valve members are positioned over the first and second holes and a rod inserted through the valve members diametrically across the interior of the pipeline and in sealed relation to the first and second valve members, a third hole is tapped in a wall portion of the pipeline spaced from the first and second holes, a third valve member mounted over the third hole in sealed relation to the wall portion of the pipeline, an inflatable bag inserted in deflated condition through the third valve member into the interior of the pipeline, and the bag inflated to fill the interior of the pipeline whereby to prevent the escape of gas past the bag. In order to prevent the escape of gas through the valve members when the rod and bag are inserted, a flexible sleeve is mounted on each valve member through which the rod or bag is inserted while maintaining sealed engagement between the rod or bag, as the case may be. Upon completion of the repair, the steps are reversed in removing the bag and restraining rod followed by permanently capping or sealing off the holes.

The above and other objects, advantages and features of the present invention will become more readily appreciated from a consideration of the following detailed description of a preferred embodiment thereof, when taken together with the accompanying drawings, in which:

BRIEF DESCRIPTION OF THE DRAWINGS

FIG. 1 is a view partially in section illustrating the installation of a preferred form of apparatus in accordance with the present invention;

FIG. 2 is a cross-sectional view illustrating in enlarged form the installation of a restraining rod assembly forming a part of the preferred form of the present invention;

FIG. 3 is a view partially in section of a dressing tool utilized in connection with carrying out the method of the present invention;

FIG. 4 is another cross-sectional view illustrating the final step of sealing the control fittings upon completion of a repair operation in accordance with the preferred method of the present invention; and FIG. 5 is a view partially in section of a modified form of inflatable bag system to form a part of the apparatus of the present invention.

DETAILED DESCRIPTION OF THE PREFERRED EMBODIMENT

Referring in more detail to the drawings, FIGS. 1 and 2 illustrate the mounting of a seal-off apparatus 10 in a pipeline P. The present invention may be best typified by describing its installation in a gas main composed of steel or cast iron wherein it is important to prevent the escape or leakage of gas both during installation of the apparatus 10 and subsequently during the repair or servicing of the main. Again, referring to FIGS. 1 and 2, the apparatus 10 is broadly comprised of a restraining rod 12 inserted through first and second valve members 14 and 15, the latter being mounted in diametrically opposed holes or openings 16 and 17 in outer wall W of the pipeline P. A third valve member 18 is disposed in a larger hole or opening 20 so as to be centered between and at right angles to the valve members 14 and 15. A flexible sleeve or sock 22 is secured to one side of the valve 18 opposite to the opening 20 to permit insertion of an inflatable bag 22, the bag 24 being inserted through the flexible sleeve 22 and open valve member 18 into the interior of the pipeline directly ahead or upstream of the restraining rod 12. An inflation line 26 is attached to a source of air under pressure designated at S in order to inflate the bag 24 into the condition as illustrated in full in FIG. 1, a pressure gauge G being positioned in the line to determine the pressure level in the bag.

Now considering in more detail the installation of the restraining rod 12, a control fitting or nipple 30 is welded to the exterior of the wall of the pipe and each of the openings 16 and 17 is tapped with a suitable tapping machine. Each valve 14 and 15 is threaded onto the nipple 30 and another nipple 32 is threaded into the outside of each valve. Although not shown, flexible sleeves identical in construction to the sleeve 22 but of a smaller diameter are secured or placed over the nipples 32 on the outside of each valve 14 and 15 to maintain the sealed engagement with the restraining rod 12 when it is inserted into the pipeline P. The restraining rod 12 is inserted through the diametrically opposed valve members 14 and 15, the rod having a handle or cap 33 at one end and a threaded end portion 34 at the opposite end. A rubber washer 35 and metal washer 36 are assembled onto each end of the rod 12, and a wing nut 40 is threaded onto the end 34 to securely tighten the washers 35 and 36 against the fittings 32 and tightly seal the valves 14 and 15 against the escape of any gas therethrough.

In order to install the valve 18, the larger hole 20 is tapped into the wall of the pipe P after a control fitting 42 has been welded to the exterior wall of the pipe, as shown in FIGS. 1 and 2. Another fitting 44 is threaded into the outside of the valve 18, the fitting 44 including diametrically opposed, radially extending handles 45. As best seen from FIGS. 1 and 3, the flexible sleeve or sock 22 has an enlarged generally tubular end portion 46 which is placed over the external end of the fitting 44 and sealed in place by means of a clamp or band 48. The sleeve tapers away from the enlarged end 46 as designated at 50 and terminates in an outer open end 51 which is of a diameter sufficient to permit insertion of the bag 24 in deflated condition through the sleeve 22, and the rod 12 will serve to guide the bag 12 into proper position. In the process of inserting the bag 24 through the sleeve and valve member 18, the tapered portion 50 may be grasped in the hand and folded tightly against the inflation line 26 to prevent the escape of any gas outwardly past the valve 18 and sleeve 22. Once the bag 24 is fully inserted into the line as illustrated in FIG. 1, any suitable form of tape or clamp 51' may be utilized to wrap and contract the outer end 51 of the sleeve into sealed engagement with the inflation line 26. Preferably, the sleeve 22 is composed of a non-porous rubber or rubber-like material, such as, Nylon. A smaller sleeve; i.e., one of lesser diameter but of identical construction and configuration to the sleeve 22 can be employed for installation and removal of the restraining rod in a manner to be described.

As a preliminary to insertion of the bag 24 into the main, a file is inserted through the sleeve 22 and open valve 18 to grind off any burrs or jagged edges around the hole 20. The file is removed and, as illustrated in FIG. 3, a dressing tool T having a wire brush W at one end is then inserted through the sleeve 22 and valve member 18 to dress the edge of the hole 20. In these filing and dressing operations, the tapered end 50 of the sleeve 22 can be grasped in the hand to seal the sleeve against the handle of the tool while manipulating it through the open valve member 18. In a similar manner, the sleeves that are employed for insertion of the restraining rod can be grasped in the hand to maintain sealed engagement with the rod as it is advanced through the valve members 14 and 15 with the washers 35 and 36 first assembled onto the handle end 33 of the rod; and, upon insertion, the washers 35 and 36 together with the wing nut 40 are assembled onto the threaded end 34 and the wing nut 40 tightened to seal the restraining rod 12 in position as described. Thereafter, the sleeves are removed from the fittings 32.

Preferably, the valve members 14 and 15 as well as the valve 18 are sandwich valves which can be manually opened and closed. For example, one suitable form of valve member 18 is a slide gate valve Model H-10917 manufactured and sold by Mueller Company of Decatur, Ill. The valves 14 and 15 are smaller than the valve 18 to accommodate the insertion of the restraining rod 12 which, for example, is typically on the order of ½" diameter. A preferred form of bag 24 is the gas bag manufactured and sold by ALH Systems, Inc. of Wiltshire, England and which is a reinforced nylon bag having an inner perforated inflation rod 25 terminating in a metal button 27 on the external surface of the bag and which will encourage the bag to slide along the bottom of the pipe as it is being inflated so that it does not become lodged against the inner wall surface of the pipe. When inflated, the bag 24 will expand into firm engagement with the restraining rod 12 which as described extends crosswise to the direction of insertion of the bag 24. The rod 12 will assist in guiding the bag 24 into position, as shown in FIG. 1; and, in the event of possible rupture of the bag, the rod 12 will prevent the bag 24 from becoming separated from the inflation line and becoming lost down the main.

It will be evident that one or more installations of the bag 24 and restraining rod 12 may be made at spaced intervals along the length of the pipeline. For instance, in repairing a section of the main, it is desirable to place a bag 24 and restraining rod 12 both upstream and downstream of the section to be repaired so as to completely block off the section from the leakage of gas. Once the installation is completed, the bag 24 is deflated, the wrapping 51' removed from the outer end of the sleeve 22 and the bag removed through the valve member 18 and sleeve 22. As shown in FIG. 4, the control fitting 42 is plugged off with an internal seal plug 54, following which the valve 18 is removed and a cap 55 threaded onto the external surface of the fitting 42. In a similar manner, the restraining rod 12 is removed by first unthreading the wing nut 40, advancing the rod through the valve 15, placing a plug 56 in the interior of the control fitting 30, removing the valve 15 and placing a cap 57 on the fitting 30. The same procedure is followed in withdrawing the rod from the valve 14 and sealing off its control fitting 30 with a plug 56 and cap 57.

In actual practice, when the bag 24 is to be installed in cast iron pipe, the control fittings 26 and 30 are welded to a split compression coupling which is placed over the pipeline, since the fittings cannot be welded directly to the pipeline. The valve member 18 is installed onto the fitting 26 and a conventional tapping machine is then attached to the valve 18; the valve 18 is opened and the pipe is tapped through the valve; and, once the tap is complete, the tapping cutters are retracted and the valve closed followed by removal of the tapping machine. The same procedure is followed in tapping holes for the restraining rod valves 14 and 15. In dressing the tap hole 20, the adapter sleeve 22 is attached to the valve 18 as described with a file positioned inside of the adapter. The valve 18 is opened to permit filing of the tap hole after which the file is removed and the valve closed. The dressing brush T is then inserted into the adapter sleeve 22 to brush any filings toward the downstream end, following which the brush is retracted and removed from the valve and the valve closed. The inflation bag 24 is then inserted into the sleeve 22 and the valve 18 is opened for insertion of the bag into the line. The bag is inflated to stop gas flow as required and, once the flow of gas is stopped, any gas remaining within the sock should be purged through an existing service or vent. Once the gas line is purged, the sleeve 22 can be removed.

DETAILED DESCRIPTION OF MODIFIED FORM OF INVENTION

As illustrated in FIG. 5, other types of inflation bags may be utilized in place of the bag 24 and, in FIG. 5, like parts are correspondingly enumerated to those of FIGS. 1 to 4. Thus, as in the preferred form, a control fitting 44' is attached to a valve member 18, not shown, and a sleeve adapter 22' of tapered conical configuration has its enlarged end 46' secured by a suitable clamp 48' to the outer end of the fitting 44'. A modified form of bag 60 is illustrated in deflated condition and differs from the bag 24 of FIG. 1 principally in the respect that it does not include any form of internal tubing or reinforcing, such as, the tubular element 25. In order to facilitate insertion of the bag 60, it is folded and secured to a guide rod 62 by means of suitable wraps, such as, the Velcro strips 64 at longitudinally spaced intervals along the bag 60. The wrapping 64 should be sufficient only to temporarily secure the bag to the reinforcing rod 62 in a compact deflated condition as shown to enable easy insertion through the valve and into the pipe with sufficient control over the bag 60 to insure that it is positioned upstream of the restraining rod. When the bag 60 is inflated, as described in conjunction with FIG. 1, the wrapping strips 64 will be severed as the bag is inflated to a degree sufficient to fill the line. The rod 62 will of course remain inside the pipe after the bag 60 has been inflated. Once the repair operation has been completed, the bag 60 is deflated as previously described in conjunction with the bag 24 and removed along with the rod 62 if the rod should still be attached to the bag; otherwise, the rod 62 will simply remain in the line and only the bag 60 withdrawn from the line. In all other respects, the installation and use of the bag 60 with a restraining rod 12 is the same as described in conjunction with FIGS. 1 to 4 of the preferred form.

It is therefore to be understood that while preferred and modified forms of apparatus are herein set forth and described together with the preferred method of the present invention, the above and other modifications and changes may be made without departing from the spirit and scope of the invention as set forth in the appended claims and reasonable equivalents thereof.

I claim:

1. In a pipeline, such as, a gas main to be repaired or serviced, the combination therewith comprising:
    first and second valve means disposed at diametrically opposed wall portions of said pipeline in communication with said pipeline;
    a restraining rod removably inserted through said first and second valve means for extension across the interior of said pipeline;
    third valve means disposed in a wall of said pipeline at an angle to said first and second valve means and in communication with the interior of said pipeline;
    an inflatable bag member inserted through said third valve means into the interior of said pipeline including means for guiding said inflatable bag member in deflated condition into the interior of said pipeline adjacent to said restraining rod; and
    inflation means for inflating said bag member to fill the interior of said pipeline and expand against said rod whereby to prevent said bag member from becoming separated from said inflation means and becoming lost down said pipeline.

2. In a pipeline according to claim 1, said third valve means being centered in said wall between said first and second valve means with said restraining rod extending at right angles to the direction of insertion of said inflatable bag member.

3. In a pipeline according to claim 1, flexible sealing means including a sleeve member disposed on one side of said third valve means opposite to said wall of said pipeline, and means for inserting said inflatable bag member through said sleeve and said third valve means into the interior of said pipeline.

4. In a pipeline according to claim 3, said inserting means including an inflation line extending from said bag member, a source of air under pressure connected to said inflation line, said flexible sealing means being engageable in sealed relation to said inflation line when said bag member is inserted into the interior of said pipeline.

5. In a pipeline according to claim 4, said third valve means including a control fitting, said sleeve including an enlarged end mounted in sealed relation to said control fitting and a tapered end extending away from said enlarged end.

6. In a pipeline according to claim 1, said restraining rod including means for mounting said restraining rod in sealed relation to said first and second valve means with said restraining rod extending perpendicular to said third valve means.

7. In a pipeline according to claim 6, said restraining rod including a handle at one end and a threaded portion at an opposite end thereof, and means threadedly engaging said threaded end portion of said restraining rod in sealed relation to said first and second valve means.

8. In a pipeline according to claim 1, including a guide rod and means for temporarily securing said inflatable bag member to said guide rod whereby to guide said inflatable bag member into the interior of said pipeline.

9. The method of repairing pipelines, such as, gas means in situ to prevent the escape of gas during repair comprising the steps of:

(a) tapping first and second holes in diametrically opposed sidewall portions of said pipe;

(b) aligning first and second valve members with said first and second holes and in sealed relation to said wall portions;

(c) removably inserting a rod through said first and second valve members diametrically across the interior of said pipeline and in sealed relation to said first and second valve members;

(d) tapping a third hole in a wall portion of said pipeline spaced from said first and second holes;

(e) aligning a third valve member with said third hole in sealed relation to said wall portion of said pipeline;

(f) inserting an inflatable bag in deflated condition through said third valve member into the interior of said pipeline and guiding into position upstream of said rod; and (g) inflating said bag to fill the interior of said pipeline and expand into firm engagement against said rod and prevent bag from becoming lost down said pipeline whereby to prevent the escape of gas past said bag.

10. The method according to claim 9, including the step of deflating said bag and removing said bag through said third valve member after repairing said pipeline.

11. The method according to claim 10, including the step of positioning a sealing member in said third valve member after deflation and removal of said bag from the interior of said pipeline.

12. The method according to claim 9, wherein said inflatable bag is inserted into the interior of said pipeline at right angles to said restraining rod and upstream of said restraining rod.

13. The method according to claim 9, wherein step (e) is characterized by mounting a flexible sealing member on one side of said third valve member opposite to said third hole.

14. The method according to claim 13, wherein said inflatable bag includes an inflation line extending from said bag through said third valve member when said bag is inserted into the interior of said pipeline, and disposing said sealing member in sealed relation to said inflation line when said bag is inserted into said pipeline.

* * * * *